(No Model.)
E. A. COUCH.
WHEEL CULTIVATOR.
No. 500,799. Patented July 4, 1893.
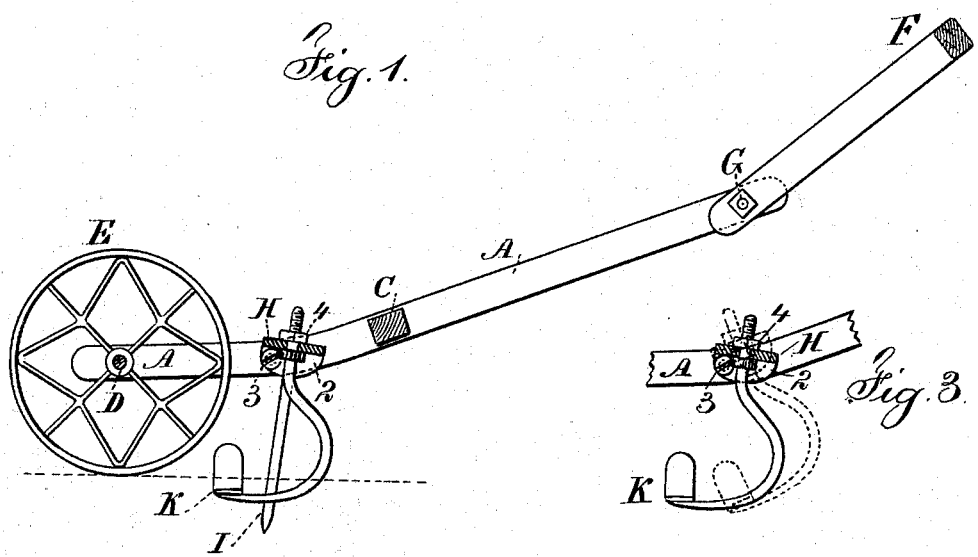
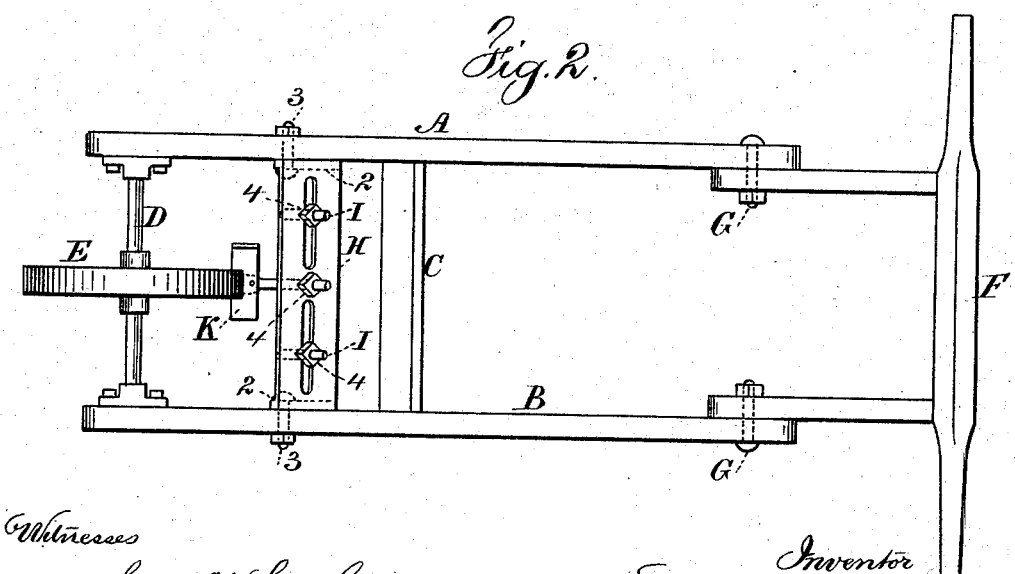
Witnesses
Chas H. Smith
J. Staib
Inventor
Edwin A. Couch
per Lemuel W. Serrell
Atty

UNITED STATES PATENT OFFICE.

EDWIN A. COUCH, OF PLAINFIELD, NEW JERSEY.

WHEEL-CULTIVATOR.

SPECIFICATION forming part of Letters Patent No. 500,799, dated July 4, 1893.

Application filed October 25, 1892. Serial No. 449,958. (No model.)

*To all whom it may concern:*

Be it known that I, EDWIN A. COUCH, a citizen of the United States, residing at Plainfield, in the county of Union and State of New Jersey, have invented an Improvement in Wheel-Cultivators, of which the following is a specification.

In my present improvement a frame that is moved by hand is supported at one end by a wheel, and the weeding hoes and teeth are connected to a slotted cross bar between the frames so as to set nearer together or farther apart and they are also provided with screw shanks and nuts so as to raise or lower the teeth or cultivators, and the cross bar is pivotally connected to the frame so that the teeth themselves can be swung nearer to or farther from the supporting wheel, not only for the convenience of varying the position of the teeth, but also for varying the angle or inclination of the weeding blades to the frame and handles of the cultivator, so as to cause the weeding blade to cut deeper or shallower in the earth, and the handles themselves are connected with the frame by clamping screws, so that such handles can be raised or lowered for the convenience of the person using the cultivator.

In the drawings, Figure 1 is a vertical section of the cultivator complete. Fig. 2 is a plan view of the same, and Fig. 3 is a diagram illustrating the angles at which the weeding blades can be caused to travel.

The side frames A B are of suitable size and connected by a cross piece C and preferably curved as shown near the lower ends of the frames, and said frames receive an axle D for a wheel E which is preferably of wrought metal having radial spokes and connecting ties so that the wheel may be more or less elastic, and the handles F are connected with the side frames A and B by clamping bolts G, so that the handles can be brought into line with the side frames or occupy angular positions thereto, so that the handles may be in a convenient position for the person using the cultivator, and in this manner the depth of cut by the cultivating or weeding blades can also be partially regulated.

The cross head H is adapted to fit between the side frames A and B where they are curved, and it has end flanges 2 through which the clamping bolts 3 pass, which bolts not only connect the cross head to the side frames but they allow the cross head to be swung upon the bolts into a horizontal or inclined position and clamped firmly so as to prevent the cross head turning upon the bolts under the action of the cultivator teeth or weeders. This cross head is slotted longitudinally, preferably with two slots one at each side of a central hole, so that suitable teeth can be connected to the cross head either at the central hole and in line with the wheel or in slots at either side thereof and at greater or less distances apart. The teeth themselves may be in the form of rake teeth, cultivator teeth or blades as usual in cultivators, and the shank of each tooth or blade is to be screw threaded for the reception of a nut 4 that comes above the cross head, there being a shoulder below to hold the tooth in the position to which it may be adjusted.

I have represented at I a plain tooth similar to a rake tooth, and at K a cultivator blade upon a shank; and it will now be understood that the teeth or blade can be raised or lowered to any desired position relatively to the surface of the earth, and by loosening the clamping bolts 3 the cross head can be swung upon such clamping bolts into a horizontal or an inclined position and thereby the points of the teeth or the cultivator blade can be moved nearer to or farther from the supporting wheel and when moved nearer to the supporting wheel the cultivator blade is better adapted to scraping or cutting upon or near the surface of the earth, and by swinging the cultivator blade backwardly more or less, such blade receives a downward inclination and can be made to cut to a greater or less depth in the earth.

In consequence of the frames A B being curved at the cross head H, the lower part of the frame is nearly level and the shanks of the teeth are shorter than they would be if the entire frame were inclined.

I claim as my invention—

1. The combination with the side frames and supporting wheel in a hand cultivator, of a rocking cross head between the frames having end flanges and pivotal clamping bolts through the flanges for connecting the cross head with the side frames and for allowing such cross head to be turned into a horizontal or an inclined position, and cultivator teeth or blades with screw threaded shanks passing through the cross head, and nuts for adjusting and clamping the same in position, substantially as set forth.

2. The combination with the side frames and wheel in a cultivator, of separate handles pivotally attached to the side frames and capable of being raised and lowered, a rocking cross-head between the side frames having end flanges and clamping bolts for connecting the cross-head to the side frames and for allowing such cross-head to be swung into a horizontal or inclined position and weeding or cultivator teeth adjustably connected with the cross head, substantially as set forth.

Signed by me this 19th day of October, 1892.

E. A. COUCH.

Witnesses:
GEO. T. PINCKNEY,
A. M. OLIVER.